Oct. 22, 1940.  C. B. LENNEY  2,218,651
VARIABLE SPEED TRANSMISSION
Filed May 28, 1940    2 Sheets-Sheet 2

Inventor
CLARENCE B. LENNEY

By Francis J. Klempay
Attorney

Patented Oct. 22, 1940

2,218,651

UNITED STATES PATENT OFFICE 2,218,651

VARIABLE SPEED TRANSMISSION

Clarence B. Lenney, Warren, Ohio

Application May 28, 1940, Serial No. 337,621

12 Claims. (Cl. 74—194)

This invention relates to a power transmission device and more particularly to a transmission in which the ratio of speed between the driving and the driven shafts may be infinitely varied at will. The transmission is of the friction type and the invention includes improvements in the mechanical elements and arrangement whereby the driving forces are transmitted through the frictional unit without slippage and without excessive wear of any part. An important object of the invention is the simplification of the operative elements of the transmission and of the arrangement of such elements in order to reduce the cost of production of the mechanism, to render the same more durable and rugged in use, and to eliminate all vibration and chattering therein whereby the usefulness of the assembly is materially enhanced.

Another object of the invention is to provide a transmission of the variable speed type having the characteristics indicated above which will operate equally well in both directions and in which the speed ratio may be varied either while running or at rest.

Still another object of the invention is to provide an infinitely variable speed transmission which is compact in design, in which the driving and driven shafts are axially aligned and which may be readily constructed in an economical manner.

The design of the transmission readily lends itself to combination with a motor and my invention also includes a novel variable speed power unit in which a motor is combined with the transmission in a novel manner.

The present application is a continuation in part of the applicant's prior application Serial Number 193,785, filed March 3, 1938.

These and other objects and advantages of the invention will become apparent from a consideration of the drawings and the following detailed specification.

Figure 1:
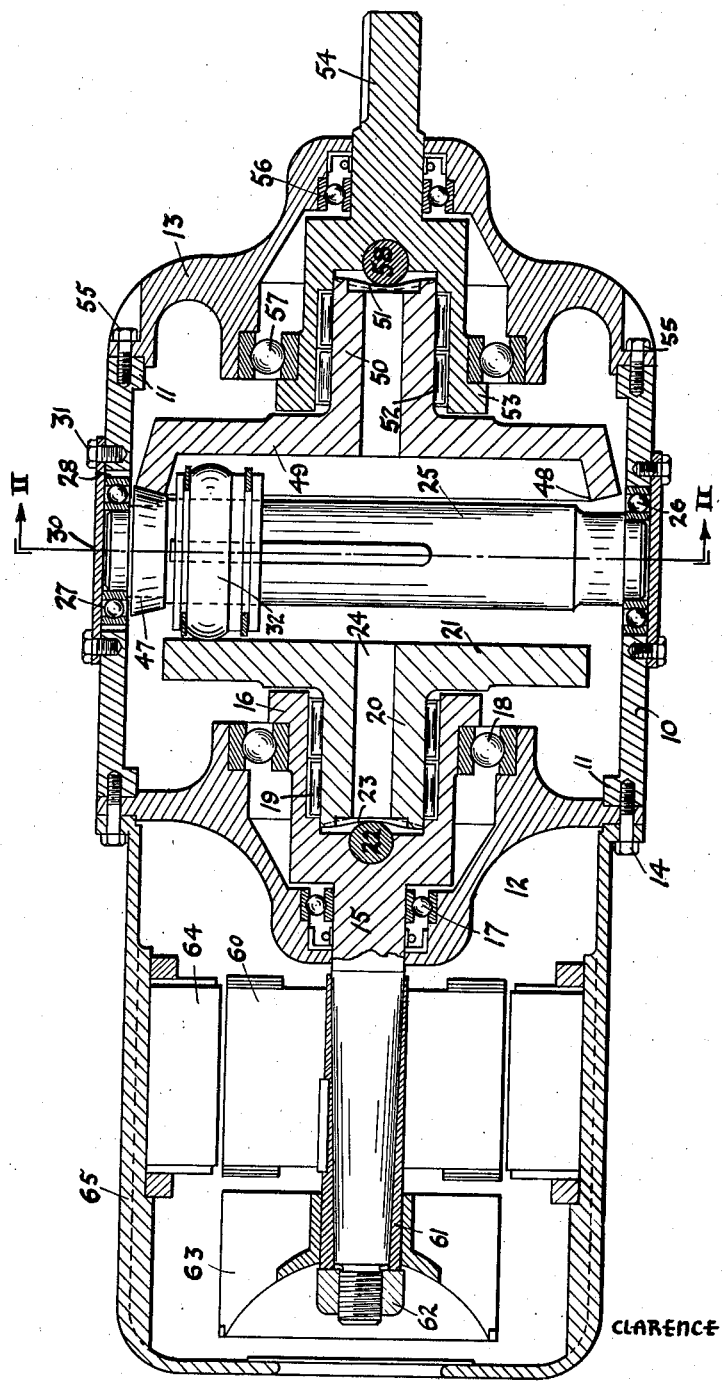
Figure 1 is a horizontal sectional view of a transmission constructed in accordance with the principles of the invention.
Figure 2:
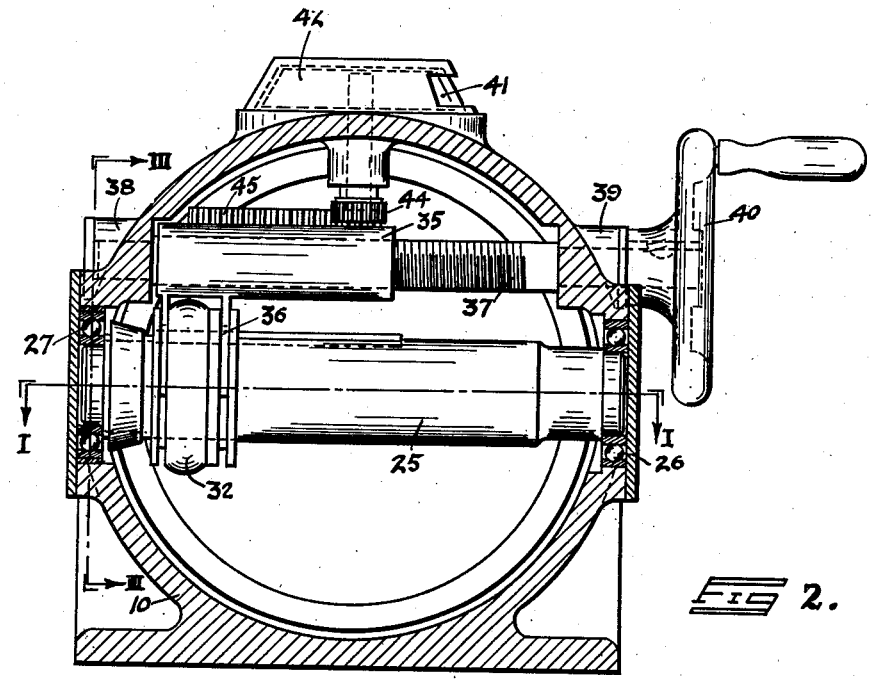
Figure 2 is a transverse sectional view of the transmission of Figure 1, the view being taken along the line II—II of Figure 1.

The preferred embodiment of the invention, as illustrated in the above described drawings, includes a cylindrically shaped center housing section 10 having inwardly directed flanges 11 at the ends thereof to which is secured in any suitable manner the end casing sections 12 and 13, respectively, each of which is adapted to rotatably support one of the outer connecting shafts of the mechanism. For example, the end casing section 12, being secured to the casing section 10 by the cap screws 14, is adapted to rotatably support the driving shaft 15 which is provided with an enlarged end socketed inner end 16. Two widely spaced antifriction bearings support the shaft in the section 12 and the smaller of these bearings, designated by reference numeral 17, is mounted adjacent the outer end of the member 12 and carries a radial load only. The larger of the antifriction bearings, designated 18, is mounted at the inner end of the member 12 and about the enlarged inner end 16 of the shaft 15 and is adapted to carry both radial and thrust loads.

Within the finished socket of the shaft 15 is fitted an elongated needle roller bearing 19 to receive the hardened and ground hub 20 of a driving disk 21. The driving disk is free to rotate in the socket of the shaft 15 in a very sensitive manner. Extending diametrically through the shaft 15 at the base of the socket therein is a bore adapted to tightly receive a hardened and ground pin 22. The center of the pin and the bore is beyond the inner end of the socket but a portion of the periphery of the pin extends into the socket as shown in Figure 1. The end of the hub 20 is provided with a shallow transversely extending groove 23, the outer surface of which is adapted to be in contact with the outer periphery of the pin 22. It should be apparent that upon any relative rotation between the driving disk 21 and the driving shaft 15, the disk will move in a direction outwardly of the socket with respect to the socket and shaft by reason of the cam action between the pin 22 and groove 23. Hub 20 is provided with a large longitudinal bore 24, as shown, to provide proper lubrication of the various wearing surfaces within the socket.

Figure 3:
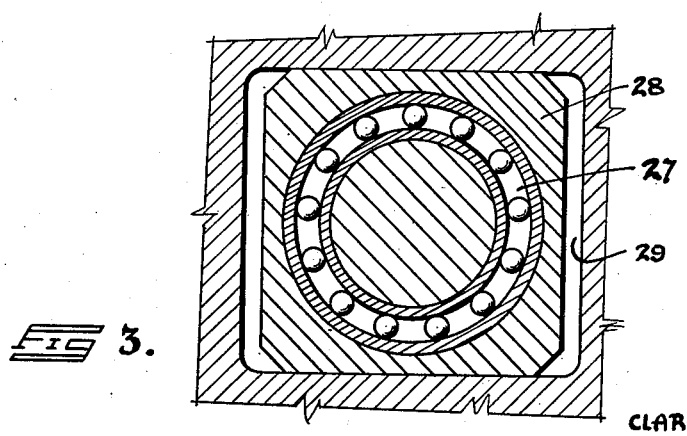
Figure 3 is an enlarged sectional view of a portion of the apparatus constituting the invention, the view being taken along the line III—III of Figure 1.

Extending transversely of the axis of rotation of the driving shaft and disk is a heavy shaft 25, one end of which is journaled in an antifriction bearing 26 suitably mounted in the wall of the casing section 10. The other end of the shaft 25 is journaled in an antifriction bearing 27 which in turn is mounted in a steel sliding block 28 mounted for limited horizontal sliding movement in a window 29 in the wall of the casing section 10 diametrically opposite the first mentioned end of the shaft 25. See Figure 3. Block 28 is suitably retained in position axially of the shaft 25 by the cover plate 30 which is detachably secured to the casing section 10 by the cap screws 31.

A hardened steel roller 32 is feathered on shaft 25 toward the end thereof which is carried by the block 28. The outer periphery of the roller 32 is adapted to be maintained in pressure contact with the ground plane face of the driving disk 21. Roller 32 is arranged to be moved longitudinally along shaft 25 by a member 35, having downwardly extending forks 36 to engage opposite faces of the roller 32. Member 35 is moved in a path parallel with the axis of rotation of the shaft 25 by a screw 37 threadedly received in a threaded bore through the member 35. Screw 37 is journaled in and held from axial movement by the bearings 38 and 39 in the casing section 10 and is adapted to be rotated by a hand wheel 40. It should be obvious, however, that screw 37 may be rotated by a motor, remote control or other automatic means, if desired.

The position of the roller 32 axially of the shaft 25 determines the speed ratio between the driving and driven shafts of the mechanism and to indicate the position of the roller 32 so as to indicate the speed ratio at which the mechanism is running, an indicator dial 41, suitably housed in a protective cover 42, is mounted on top of casing section 10. Dial 41 is keyed to a shaft 43 having a pinion gear 44 keyed to its lower end and the pinion gear 44 meshes with a rack gear 45 suitably fastened to the upper surface of the roller moving member 35.

Keyed to the shaft 25 adjacent to but spaced from the block 28 is a beveled roller 47, the peripheral surface of which is hardened and ground. This roller is adapted to contact the hardened and ground beveled ring face 48 of the driven disk 49. The latter is provided with a hollow ground and hardened hub 50, identical with the hub 20 of the driving disk 21, and the end of the hub 50 is provided with a transversely extending shallow groove 51, identical with the first described groove 23. Hub 50 is journaled in needle roller bearings 52 which in turn are fitted within the socket of the enlarged inner end 53 of the driven shaft 54. Shaft 54 is rotatably supported by the end casing section 13 which is detachably secured to the casing section 10 by the cap screws 55, for example, and for the purpose of so mounting the shaft 54 an antifriction bearing 56 is provided adjacent the outer end of the member 13 to take radial loads, while an enlarged antifriction bearing 57 rotatably supports the enlarged inner end of the shaft 54 and is arranged to take both radial and thrust loads. A transversely extending hardened and ground steel pin 58 is mounted in the shaft 54 to engage groove 51, the arrangement being similar in all respects to the torque loading arrangement described for the driving end of the transmission.

The operation of the mechanism thus far described should now be readily understood. If rotative power is supplied to shaft 15 and resistance to rotation is encountered by shaft 54, the curved surfaces 23 and 51 instantly act to tighten up the contact between disk 21 and roller 32 and between bevel roller 47 and bevel ring 48. Sufficient friction is thereupon developed between these driving surfaces to insure the transmission of the rotative power without slippage. The grooves 23 and 51 are of sufficient depth to insure the transmission of the rotation from shaft 15 to disk 21 and from disk 49 to shaft 54. By floatingly mounting the roller end of the transverse shaft 25, thereby allowing said end to be moved a short distance sideways, any rotative impulse applied to the shaft 15 is immediately operative to apply pressure between the bevel surfaces 47 and 48 as well as between disk 21 and roller 32. Consequently, disk 49 assumes rotation with the rotation of shaft 15.

The transmission is intended to operate in a bath of oil and for this purpose the casing made up of the sections 10, 12 and 13 is made oil tight and is provided with suitable means, not shown, whereby oil may be supplied to and drawn from the casing. All bearing and wearing surfaces are continuously and adequately lubricated. Since every moving part of the apparatus is in dynamic balance, no vibration of any kind is inherent in the operation of the apparatus and by eliminating the necessity for any gears whatsoever the apparatus is very quiet in operation. The symmetry of the grooves 23 and 51 enables the transmission to operate in either direction with equal results and efficiency.

The high pressures employed between the driving disk 21 and the roller 32 in the normal operation of the transmission results in considerable heating taking place on the peripheral surface of the roller and it has been found desirable to employ a heat resisting tool steel in the construction of this element. Inasmuch as the wearing surface of the driving disk is distributed over a wide area, no excessive local heating takes place on this member. All the bearing and wearing surfaces are cooled by the oil bath which tends to equalize the temperature throughout the unit and the radiation and conduction of heat from the unit generally has been found sufficient to prevent undue heating of the same.

While obviously steels of various compositions may be used for the friction elements, depending on cost and service considerations, I have found that steel consisting of 2.10% carbon, .25% manganese, .25% silicon, 12.50% chromium, .50% nickel, balance iron, properly heat treated, is well suited for the disk and steel consisting of .70% carbon, .35% manganese, .20% silicon, 3.75% chromium, 18.50% tungsten, 1.10% vanadium, balance iron, properly heat treated, is well suited for the roller. Carbon and chromium add hardness and toughness to the disk and the tungsten in the roller lends heat resisting qualities thereto. It is also thought that the use of dissimilar metals increases the coefficient of friction between the elements.

The design of the applicant's apparatus is such that one of the shafts, as the shaft 15, may be integrally extended, as shown in Figure 1 of the drawings, to receive a rotor 60 of an electric motor. For this purpose the extended end of the shaft is tapered and a tapered sleeve 61 is positioned over the shaft and within the bore of the rotor and the assembly is wedged up tight and held in tightened position by a nut 62 threaded on the outer end of the shaft. An air impeller 63 may also be attached to the shaft 15 outwardly of the rotor 60. The stator 64 of the motor is secured within housing 65 which is adapted to be secured to the center casing section 10 by the cap screws 14 and when the parts are so assembled the stator is in proper position relative to the motor. It should be observed that no additional bearings or shafts are required for the motor and that only an additional housing member is required. The combined unit is compact in design, quiet and efficient in operation and is well suited for a wide variety of uses.

It should now be apparent that the invention provides an apparatus which fully accomplishes the objects initially set out. The elimination of all tooth gearing substantially reduces the cost of producing the transmissions, eliminates vibration and chattering and results in very quiet operation of the assembly. By carrying the transverse shaft 25 and the attendant roller moving and position indicating assembly entirely by the center casing section 10 and by rotatably supporting the driving and driven shafts and disks entirely by the respective end casing sections, the assembly and servicing of the mechanism is greatly facilitated.

The above specifically described embodiment of the invention should be considered as illustrative only and reference should accordingly be had to the appended claims in determining the scope of the invention.

What I claim is:

1. A variable speed power transmission device comprising in combination a casing having end members and an intermediate section, shafts carried by and journaled intermediate their ends in spaced axially aligned bearings in said end members, a member positioned within said casing and carried by and rotatable with one of said shafts, a face plate rotatably carried by the inner end of the said one of said shafts, a third shaft rotatably carried by said intermediate section and extending transversely of said first mentioned shaft, a roller keyed to said third shaft and adapted to be maintained in pressure contact with said face plate, said pressure being maintained by means positioned between said rotatable member and said face plate and adapted to move said face plate and said member away from each other upon relative rotation thereof, means to move said roller axially along said third shaft, and means to transmit rotary motion from said third shaft to the other of the shafts journaled in said end members.

2. A variable speed power transmission device comprising a casing having end members and an intermediate section, shafts carried by and journaled intermediate their ends in spaced axially aligned bearings in said end members, a member positioned within said casing and secured to one of said shafts at a point spaced from its inner end, a face plate rotatably carried by the inner end of the said one of said shafts, a third shaft journaled in said intermediate section and extending transversely of the said one of said shafts, a roller keyed to said third shaft and adapted to be maintained in pressure contact with said face plate, said pressure being maintained by means positioned between said member and said face plate and adapted to move said member and said face plate apart upon relative rotation thereof, means to transmit rotary motion from said third shaft to the other of the shafts journaled in said end members, a screw journaled and axially fixed in said intermediate section, a member having screw threaded connection with said screw adapted to confine the axial position of said roller, a rack carried by said last mentioned member, a shaft journaled in said intermediate section and having an attached pinion meshing with said rack, and an indicator keyed to said last mentioned shaft outside of said intermediate section.

3. A variable speed power transmission device comprising in combination a casing having end members and an intermediate section, shafts carried by and journaled intermediate the ends in spaced axially aligned bearings in said end members, one of the bearings in each of said end members being capable of opposing both axial and thrust loads, the inner end of one of said shafts being provided with an axially opening socket, a cam surface in the bottom wall of said socket, a face plate having an attached hub rotatably received within said socket, the inner end of said hub being provided with a cam surface whereby relative rotation between the said one of said shafts and said face plate will result in said hub and face plate being moved in a direction outwardly of said socket, a third shaft rotatably carried by said intermediate section and extending transversely of said first mentioned shaft, a roller keyed to said third shaft adapted to contact said face plate, means to move said roller axially along said third shaft, and means to transmit rotary motion from said third shaft to the other of the shafts journaled in said end members.

4. Apparatus according to claim 1 in which said last mentioned means includes a frusto-conical roller keyed on said third shaft, a frusto-conical ring carried by said other of the shafts, and means to maintain the interengaging surfaces of the last mentioned roller and the ring in pressure contact.

5. Apparatus according to claim 1 in which said last mentioned means comprises a roller having a frusto-conical surface keyed on said third shaft, a member connected with the said other of the shafts and having a frusto-conical surface adapted to engage said first mentioned conical surface, one end of said third shaft being floatingly mounted whereby pressure may be applied through said face plate, first mentioned roller, shaft and second mentioned roller to said last mentioned interengaging surface.

6. A variable speed transmission comprising in combination a casing, a shaft journaled intermediate its ends in one wall of said casing, said shaft being provided with an axially socketed inner end, a cam surface on the bottom wall of said socket, a face plate having an attached hub rotatably received in said socket, the inner end of said hub being provided with a cam surface to engage the first mentioned cam surface whereby said hub will be moved outwardly of said socket upon relative rotation of said shaft and face plate, a second shaft extending transversely of said first shaft and beyond the outer face of said face plate, a roller feathered on said second shaft and adapted to be maintained in pressure contact with the outer face of said face plate.

7. Apparatus according to claim 6 further including a third shaft journaled in a wall of said casing, and means to transmit rotary motion from said second shaft to said third shaft comprising a second roller keyed on said second shaft, a cooperating roller keyed on said third shaft, said second shaft being floatingly mounted whereby pressure may be applied through said face plate, first roller and second shaft to the interengaging surfaces of the second and third roller.

8. A variable speed transmission comprising in combination a casing, a shaft journaled intermediate its ends in a side wall of said casing, the inner end of said shaft being provided with an axially extending socket, a bore extending transversely of said shaft with its center adjacent the bottom wall of said socket, a pin secured in said bore and having a portion of its peripheral surface extending into said socket, a face plate having an attached hub rotatably received in said socket, the inner end of said hub having a shallow transverse groove adapted to be received about the surface of the pin in the socket whereby said shaft and face plate will be moved apart upon relative rotation thereof, a second shaft extending transversely of said first mentioned shaft, a roller feathered on said second shaft and adapted to be maintained in pressure contact with the outer face of said face plate, and means to move said roller axially along said second mentioned shaft.

9. A variable speed transmission comprising in combination axially aligned shafts, antifriction means to rotatably support said shafts and to prevent outward axial movement thereof, the inner ends of said shafts being each provided with axially extending sockets, cam surfaces in the bottom walls of each of said sockets, a face plate having a hub rotatably received in one of said sockets, a member having an annular smooth surface rotatably received in the other of said sockets, the outer ends of each of said hubs being provided with a cam surface to engage said first mentioned cam surfaces, a floatingly mounted shaft extending transversely of said first mentioned shafts and intermediate said face plate and member, a roller feathered on said transverse shaft and adapted to engage said face plate, and a second roller keyed on said transverse shaft and adapted to engage said annular surface.

10. A variable speed transmission comprising in combination a pair of spaced axially aligned shafts, antifriction bearings to rotatably support said shafts and to prevent outward axial movement thereof, a face plate rotatably mounted on the inner end of one of said shafts, a torque loading means between said face plate and the said one of said shafts, a member rotatably supported on the inner end of the other of said shafts, torque loading means between said member and the other of said shafts, an annular surface on said member concentric with the axis of rotation of said shafts, a transverse shaft positioned between said face plate and member, a roller feathered on said transverse shaft and adapted to be maintained in pressure contact with said face plate, and a second roller keyed on said transverse shaft and adapted to be maintained in pressure contact with said annular surface.

11. Apparatus according to claim 10 in which both said rollers are normally positioned to one side of the axis of rotation of the first mentioned shafts, the end of said transverse shaft adjacent said rollers being floatingly mounted.

12. A variable speed transmission comprising in combination a casing having a center and two opposed end sections, a shaft journaled in each of said end sections and restrained from radial and outward axial movement, a face plate rotatably supported by the inner end of one of said shafts, a torque loading means between said face plate and the said one of said shafts, a member rotatably carried by the inner end of the other of the shafts, a torque loading means interposed between said member and the said other of said shafts, an annular surface on said member concentric with the axis of rotation of said member and the said other of said shafts, a transverse shaft having one of its ends journaled in a wall of said center casing section, the other end of said transverse shaft being journaled in a slide block, guide surfaces carried by said center casing section and adapted to receive said slide block, said surfaces allowing sliding movement of said block toward and away from either of said first mentioned shafts, a roller feathered on said transverse shaft and adapted to be maintained in pressure contact with said face plate, and a second roller keyed on said transverse shaft and adapted to be maintained in pressure contact with said annular surface, said rollers being normally mounted on the half portion of said transverse shaft adjacent said block.

CLARENCE B. LENNEY.